W. Oldroyd.
Odometer.
N° 5,914. Patented Nov. 14, 1848.
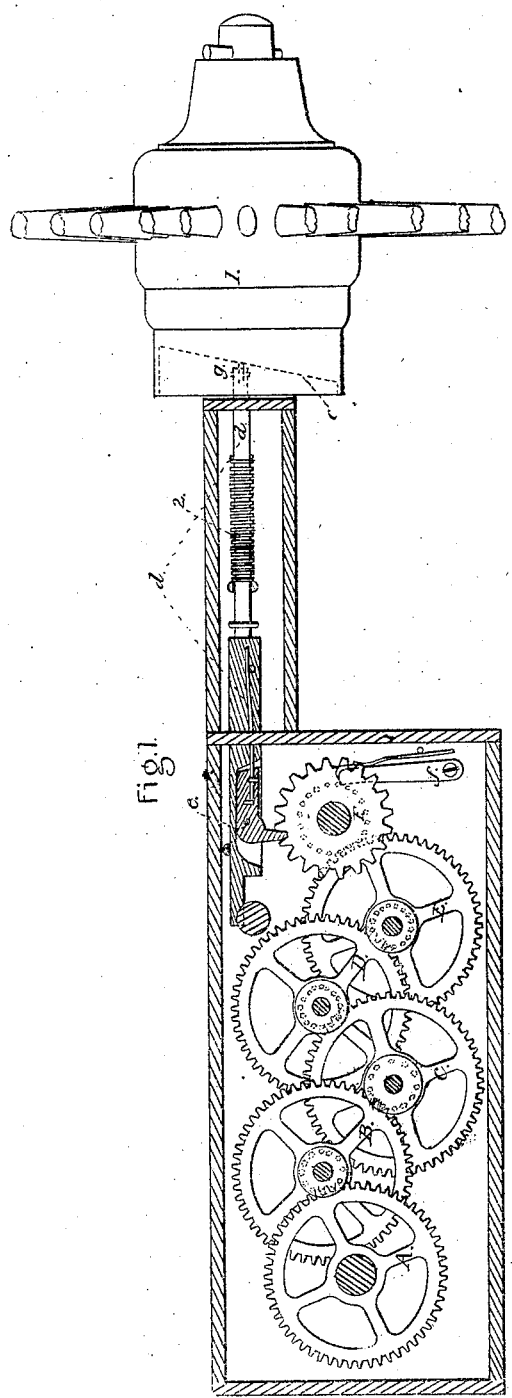
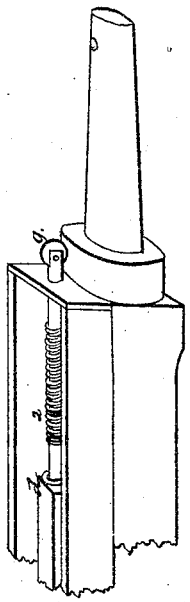
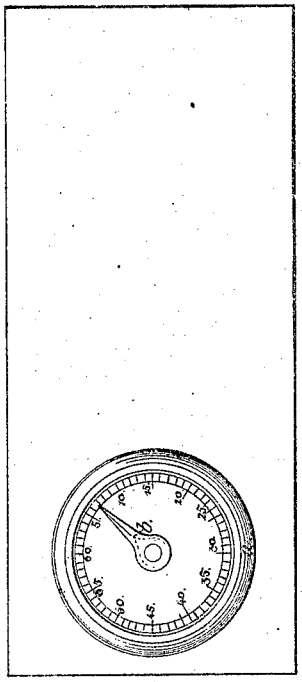

UNITED STATES PATENT OFFICE.

WILLIAM OLDROYD, OF MOUNT VERNON, OHIO.

ODOMETER.

Specification of Letters Patent No. 5,914, dated November 14, 1848.

*To all whom it may concern:*

Be it known that I, WILLIAM OLDROYD, of the county of Knox and State of Ohio, have invented a new and useful Machine for Telling the Miles a Person Travels in a Buggy, Coach, Sulky, or any other Vehicle that Runs on Wheels, called "Oldroyd's Improved Odometer;" and I do hereby declare that the following is a full and exact description of the principle or character thereof, which distinguishes it from all other things before known, and of the manner of making, constructing, and using the same, reference being had to the accompanying drawing, making part of this specification, in which—

Figure I, is a perspective representation of the machine, with the front face taken off, as it is attached to the hind axle-tree of a buggy, with a representation of a buggy hub, as at [I,], which will be more fully described hereafter. Fig. II is the front, with the face or dial plate and a small hand $b$, which goes once around in sixty miles: $a$, is a ring with a glass in it, which covers the hand similar to a watch face. Fig. III, is another view, with the hub removed. Fig. IV, is a circular inclined plane, and is attached to the largest end of a buggy hub, as at $c$, by means of a screw or otherwise.

A, is a wheel, which revolves once in sixty miles.

B, is a wheel that revolves four times as fast as wheel A.

C, is a wheel which revolves four times as fast as wheel B.

D, is a wheel which revolves five times as fast as wheel C.

E, is a wheel which revolves five times as fast as wheel D.

F, is a wheel with twenty cogs, and revolves three times as fast as wheel E, and is moved one cog at every revolution of the buggy wheel by means of a piston D, to which is attached a small wheel $g$, which is kept constantly in connection with the circular inclined plane, by means of a coiled spring 2, so that as the hub revolves, the inclined plane forces the piston forward and moves wheel F, one cog, by means of the click $c$. The click is brought back to its natural position by a spring on the piston, so that the buggy wheel makes twenty four thousand revolutions while wheel A, performs one; this divided by 60, (the number of miles above mentioned) makes four hundred revolutions in a mile, and the circumference of the buggy wheel being thirteen and one fifth feet makes 5280 feet, (the number of feet in a mile).

The click $f$, which is in connection with wheel F, is to prevent it from going backward as the click on the piston passes back to receive another cog.

What I claim as my invention, and desire to secure by Letters Patent, is—

The combination of the circular inclined plane attached to the hub of a carriage wheel with the piston $d$, click $c$ and spring, 2, for turning the cog wheels, pinions, and index, in the manner and for the purpose above set forth.

WM. OLDROYD.

Witnesses:
D. W. BLOOM,
J. VAN DEAN.